July 14, 1964
R. C. HINKLE ETAL
3,140,745
MEANS FOR STEERING A TRACTOR BY VARYING THE POINT
OF LOAD APPLICATION TO A TRANSVERSE TOW BAR
SUPPORTED BY THE TRACTOR
Filed July 25, 1958
2 Sheets-Sheet 1
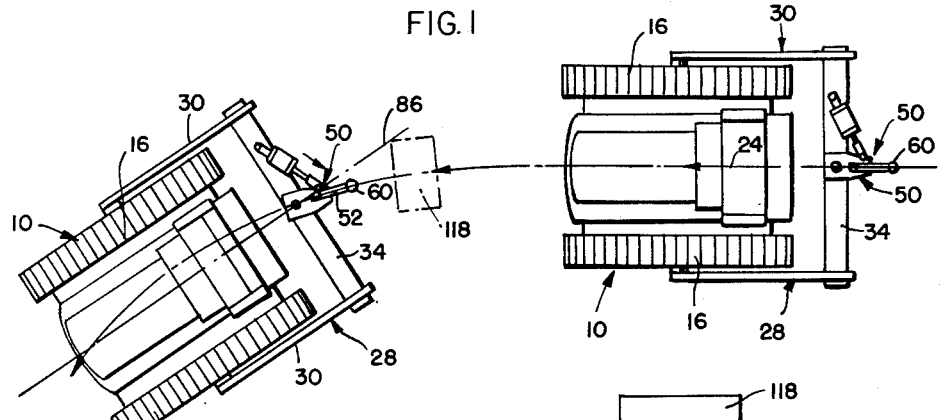
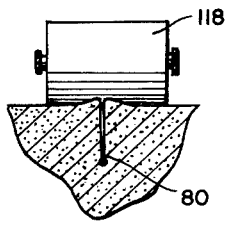
FIG. 6
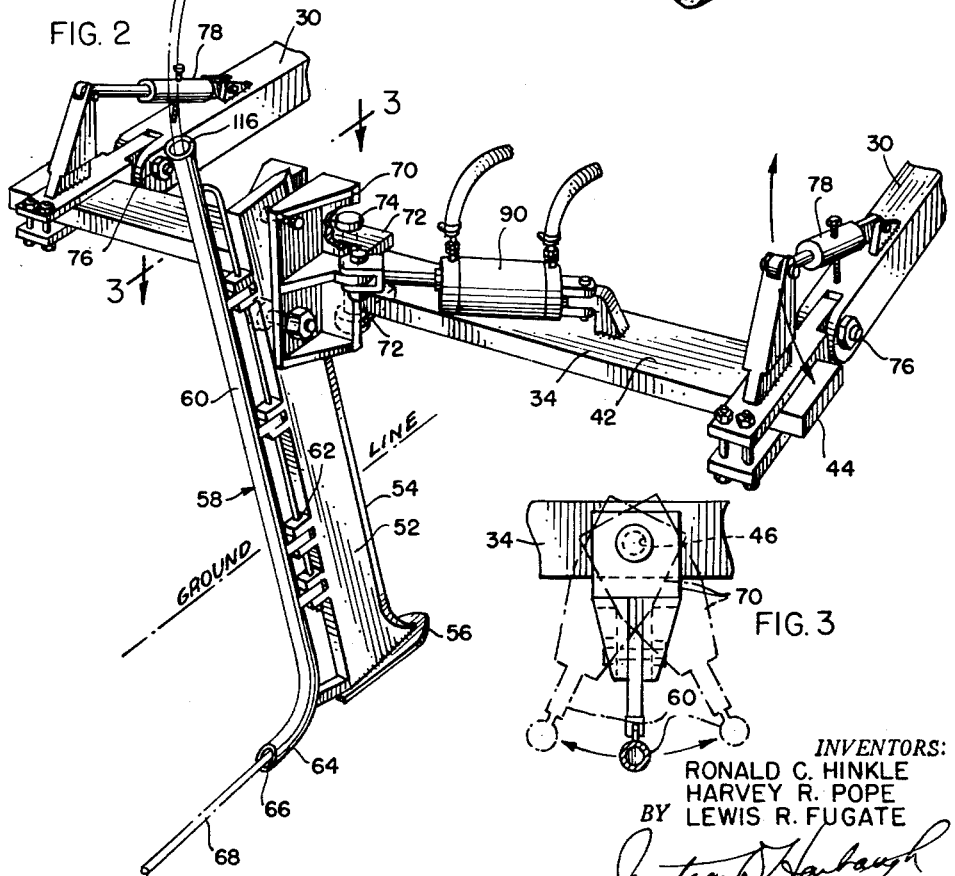
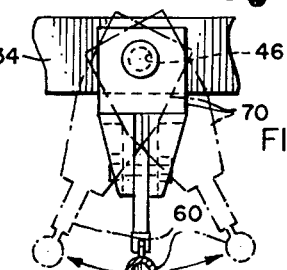
FIG. 3
INVENTORS:
RONALD C. HINKLE
HARVEY R. POPE
BY LEWIS R. FUGATE
ATT'Y

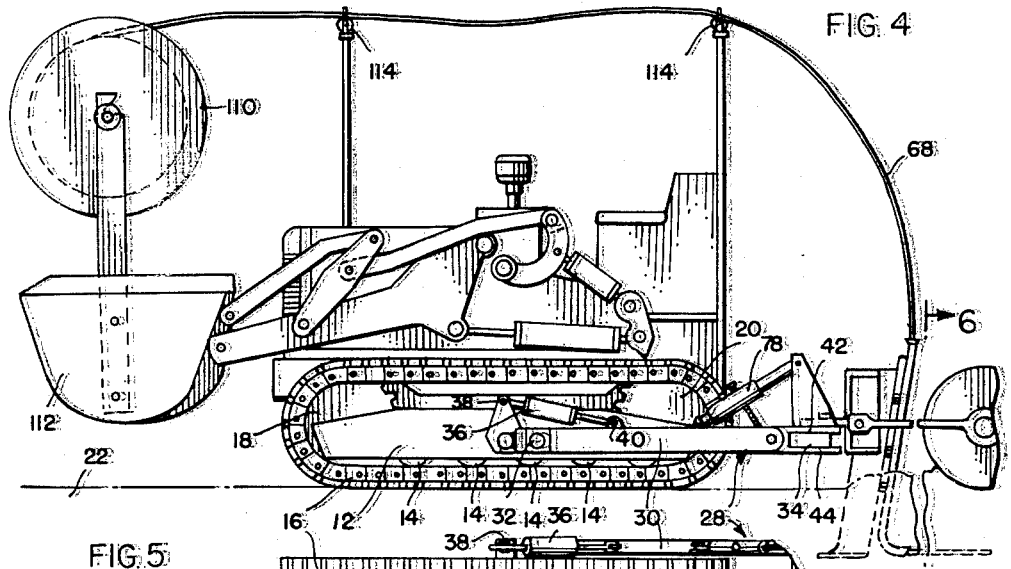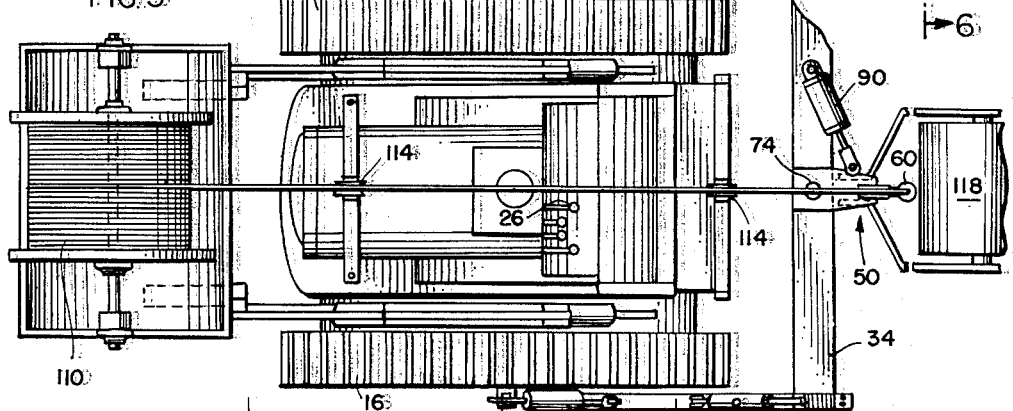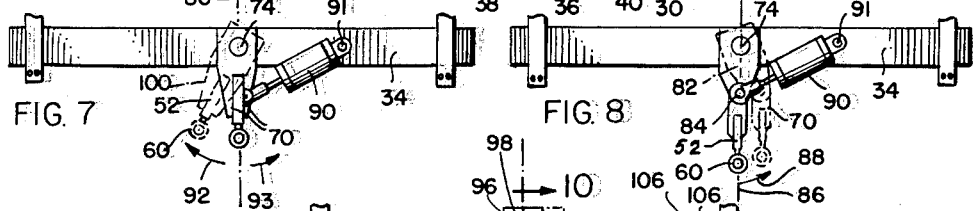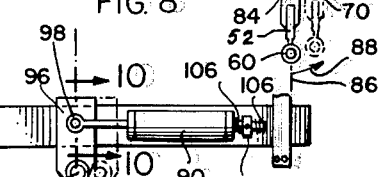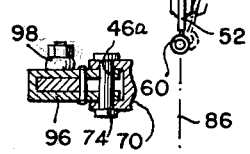

United States Patent Office 3,140,745
Patented July 14, 1964

3,140,745
MEANS FOR STEERING A TRACTOR BY VARYING THE POINT OF LOAD APPLICATION TO A TRANSVERSE TOW BAR SUPPORTED BY THE TRACTOR
Ronald C. Hinkle, Bettendorf, Iowa, Harvey R. Pope, Moline, Ill., and Lewis R. Fugate, Davenport, Iowa, assignors to Altorfer Machinery Company, Cedar Rapids, Iowa, a corporation of Iowa
Filed July 25, 1958, Ser. No. 750,938
13 Claims. (Cl. 172—292)

The present invention relates to a wire or cable laying device which buries the cable a predetermined distance in the ground without digging and refilling a trench.

In the present invention the earth is merely slit and the wire laid all in one operation with maximum speed and minimum power requirements in a manner whereby traffic upon a road is not interrupted and the road is not dangerous for travel.

A further object of the invention is to employ a track laying or crawler type tractor such as built by Caterpillar Co. which provides maximum traction with minimum power and is easily equipped with a cable reel support and an earth slitting blade pivoted on a tool bar either in front or behind the tractor.

It has been considered to be almost impossible with a crawler tractor to draw an earth moving tool such as a plow carried by the tool bar as a part of the tractor because the effective turning point of the tractor is at the center of the vehicle as established by differential speed control of the two tracks. The tool bar moves laterally under such a turning movement and this would damage a plow share attached to the tool bar if the plow was deeply engaged in the earth. Moreover, an earth working implement has difficulty in following a predetermined path due to the jerky movements developed with a crawler tractor in steering it.

The invention is characterized by an arrangement in which an earth splitter or plow blade attached to the tool bar not only performs work upon the earth but in its operation steers the tractor without requiring any differential between the driving speeds of the two tracks.

A further object of the invention is to provide an improved arrangement by which cable can be laid below the surface of the earth by a tool carried on the tractor wherein changes in direction may be accomplished at will without disengaging the tool from the earth.

A further object of the invention resides in the relationship of elements whereby a crawler tractor with continuously running treads is steered by varying laterally the effective drag point of the ground working tool upon a tool bar, regardless of whether or not the tool bar and tool are located in front or at the rear of the tractor.

A further object of the invention is to provide a cable-laying vehicle which can be controlled and managed by a single person to perform the burying of a cable in a single operation even in a well traveled unpaved road without any need for repairing the road after the cable is laid.

A further object of the invention is to utilize the superior drag strength of a crawler type tractor along with its other attributes of stability as a single unit with a plow share without damage to the plow share being induced by the movements normally experienced with the control and operation of the tractor.

Another object of the invention is to provide a ground mole for cutting underground channels in curved or straight lines with and as a part of a track laying tractor.

A further object is to provide a cable laying device which is simple in construction and operation and easy to repair and maintain.

These being among the objects of the invention other and further objects will become apparent from the drawings and the description relating thereto in which:

FIG. 1 is a plan view partly diagrammatical showing an embodiment of the invention in operation;

FIG. 2 is a perspective view of the implement and controls therefore embodying the invention;

FIG. 3 is a top view taken upon line 3—3 in FIG. 2;

FIG. 4 is a side elevation showing in greater detail the embodiment of the invention illustrated in FIG. 1;

FIG. 5 is a top plan view of the embodiment shown in FIG. 4;

FIG. 6 is a front elevational view taken upon line 6—6 of FIG. 4;

FIG. 7 is a top schematic view of the embodiment of the invention shown in FIGS. 1, 2 and 3;

FIG. 8 is a top schematic view of the preferred arrangement of the invention;

FIG. 9 is a top schematic view of another form of the invention, and

FIG. 10 is a section taken on line 10—10 of FIG. 9.

Briefly describing the invention generally, a blade or earth splitter is pivotally mounted in a trailing position for movement about a vertical axis upon the cross bar of a U-shaped draw or tool bar whose forward ends are pivoted to the tractor for movement about a horizontal axis. Vertical movement of the bar raises and lowers the earth splitter, and, with the earth splitter secured to the cross bar at the center of pull of the tractor it is drawn into the ground with the forward motion of the tractor to a predetermined depth when the bar is lowered. Preferably the earth splitter is blade-like in its shape but not necessarily so. A hydraulic cylinder interconnects the earth splitter and the tool bar so that the effective drag point for the earth splitter can be shifted laterally from the center of pull of the tractor.

The normal steering equipment for the tractor is not touched while the earth splitter is in the ground. Both treads run continuously at the same speed. The tractor is steered essentially by shifting laterally the effective drag point of the earth splitter whereby the drag effort is increased for one tractor tread more than the other. Under these conditions said other tread has a tendency to run ahead and turn the tractor while the one bearing the increased burden encounters more slippage between the tread and the earth and yields to the turn even though it continues the forward work movement of the earth splitter.

A simple arrangement of the earth splitter is preferably a blade form which cuts edgewise through the earth and presents a flat side to the ground as a support against appreciable lateral displacement thereof when the hydraulic cylinder is operated. The preferred arrangement is a double link coupling for pivotal movement about horizontally spaced vertical axes in which the splitter blade automatically points itself in the direction of drag and has its effective drag point upon the tool bar shifted laterally by having the rearmost vertical axis shifted laterally in either direction by the hydraulic cylinder. Another embodiment of the invention is to provide a drag pin which itself can be shifted along the tool bar.

Another factor in steering the tractor is that as the effective drag point is shifted laterally from a center position with respect to a member disposed in the ground as supported by the ground against lateral movement, the rear end (or front end) of the tractor is shifted slightly by the hydraulic cylinder to assist in starting a turn while the tractor is moving.

Trailing close behind or as a part of the splitter blade is an L-shaped conduit down which the cable is fed vertically and turned at the bottom to leave the conduit at the bottom of the cut where it is held by the earth all around it in immediate contact therewith.

Referring now to the drawings in further detail, a crawler tractor 10 embodying the invention is shown in operation in FIG. 1. In the particular construction of the tractor disclosed, side frames 12 (FIG. 4) are provided on each side of the tractor to which are journalled weight bearing rollers 14 that ride on a continuous track 16 on each side that is picked up and laid down continuously by an idler wheel 18 at the front and a gear wheel 20 at the rear which meshes with the continuous track 16 in a well known manner is powered from a conventional internal combustion engine and transmission (not shown) to drive the tractor 10 forwardly as guided by the laid tracks for straight-away operation. The friction between the ground 22 and the tracks 16 laid thereon with power applied to the wheels 20 is the factor that provides pulling or drag power for the tractor. With the two endless tracks on opposite sides of the tractor this drag power is not only divided equally between the tracks and gear wheel when running at the same speed but the tractor follows a straightforward line of movement indicated by arrow 24 (FIG. 1) for straight-away operation. Normally, the tractor is steered by manual controls 26 braking one or the other of the gear wheels to provide a differential in speed therebetween by which the track laid by the opposite wheel is laid more rapidly and thereby turns the tractor in a direction towards the braked side.

Secured to the frame 12 of the tractor and preferably extending rearwardly is a horizontally disposed U-shaped drag assembly 28 having the forward ends of its draft or side arms 30 pivotally mounted to the body frame 12 on pins 32 for vertical movement about a horizontal axis determined by the pins. The closed end of the U-assembly 28 which passes around the rear end of the tractor comprises a cross or tow-bar 34 which can be raised and lowered hydraulically by means of a piston and cylinder arrangement 36 having the cylinder attached as at 38 to the tractor body and the piston rod pivotally fastened to the side arm 30 as at 40. It is preferred that the tow-bar 34 be provided with vertically spaced parallel surfaces 42 and 44 of substantial width in a horizontal direction to serve as guidewalls for rigidly supporting an earth working implement 50 thereon against its work load and in a vertical position. A vertical hole 46 is provided adjacent to and preferably forwardly of the front edge of the tow-bar at a point equidistant from the tracks 16 so that the tractive effort of both tracks running continuously at the same speed are equal with respect thereto.

The preferred form of the earth working implement is a cutting blade 52 as shown in FIG. 2 which comprises a main body made of a flat bar of steel that is substantially four to six times wider than it is thick. The front edge is sharply tapered to an earth cutting edge 54 to make of it an efficient cutting blade and the lower end is provided with a mole type nose 56 welded thereon and pointing forwardly which operates as a means for leading the cutting blade 52 into the ground and provides a tunnel at the bottom end thereof when operating.

At the trailing edge of the cutting blade is a substantially L-shaped conduit 58 having the vertical upright portion 60 thereof hinged along the back edge of the blade 52 as at 62 whereby the lower end portion 64 thereof curved rearwardly may swing back and forth laterally to some extent with respect to the blade. A horizontal outlet opening 66 at the trailing end feeds the wire 68 coming through the conduit into the tunnel made by the mole nose 56.

The upper end of the cutting blade is rigidly supported in a supporting bracket 70 which has vertically spaced heavy horizontal flanges 72 which straddle the upper 42 and lower 44 faces of the tow-bar 34. At their front ends holes are provided in alignment with said hole 46 on the tow-bar through which a clevis pin 74 can be dropped to support the bracket in pivotal relationship for movement about a vertical axis with respect to the tow-bar.

In this connection, it will be noted that in the raised position the attitude of the cutting blade 52 is such that the mole nose 56 at the bottom thereof whould be inclined downwardly at its forward end and the bar itself is substantially vertical. Whereas when the bar is lowered to its working position as shown in FIGS. 2 and 4, the blade is inclined forward at its lower end and the mole nose assumes a horizontal attitude. This angle of inclination is such that the tip of the mole nose 56 is approximately in alignment with the axis of the clevis pin 74 so that substantially all of the cutter blade 52 is disposed to trail the axis of the clevis pin as it is moved forwardly through the earth as supported on the tow-bar 34.

For best results in determining the attitude of the cutting blade and the depth to which it cuts the tow-bar 34 is pivotally mounted to the rear ends of the forwardly extending arms 30 for movement about a horizontal axis by means of hinge elements 76 inter-connecting the members. The attitude of the cross bar and with it the attitude of the cutting blade is adjusted by toggle screws 78 interconnecting the side arms and tow-bar in a way tilting the cross bar. This adjustment is provided to level out the mole nose 56 and the cutting attitude of the blade 52 for different desired depths at which the wire is to be laid in the slit 80 (FIG. 6) cut by the blade 52.

In the preferred embodiment of the invention (FIG. 8) the bracket 70 supporting the cutting blade 52 is mounted upon the tow-bar 34 by vertically spaced links 82 so that it is mounted for pivotal lateral movement and bodily lateral movement about two horizontally spaced vertical axes, which are preferably spaced approximately ten to twelve inches in a direction lengthwise of the tractor. Although this locates the cutter blade farther aft of the tractor, the cutter blade is free to trail from the pin 84 defining the rearmost vertical axis of pivotal movement.

As mentioned in the objects of this invention it is desirable to shift the pin 84 directly supporting the cutter blade laterally of the longitudinal center line 86 of the tractor, i.e. in a direction lengthwise of the tow-bar 34 as indicated by the arrow 88. In the embodiment first described a hydraulic piston and cylinder control 90 interconnects the tow-bar 34 (FIGS. 2 and 7) at 91 and the cutter blade bracket 70 near its rear edge in such a way that the rear edge of the cutting blade 52 is shifted laterally in either direction as indicated by arrows 92 and 93 depending upon the control of the hydraulic fluid in the cylinder 90.

In the second embodiment the hydraulic piston and cylinder arrangement 90 interconnects the tow-bar 34 at 91 and the rearmost pivot pin 84 so that the rearmost pivotal joint by which the cutter blade 52 is secured to the tow-bar 34 is shifted laterally with respect to the longitudinal center line 86 of the tractor.

A third embodiment is illustrated in FIGS. 9 and 10 which is somewhat similar to the first embodiment described in connection with FIGS. 2 and 7. In the third embodiment a U-shaped channel member 96 is slidably mounted astraddle the front edge of the tow-bar 34a and is provided with a hole 46a which receives the clevis pin 74 that supports the cutting blade for pivotal movement about a vertical axis. In this last embodiment the piston and cylinder arrangement 90 interconnects the tow-bar 34a and the U-channel member 96 at 98 so that the clevis pin 74 is shifted rectilineally in either direction laterally of the longitudinal center line 86 of the tractor.

Each of these embodiments have certain advantages. The first embodiment not only shifts the effective drag point of the cutting blade 52 laterally of the longitudinal center line of the tractor to impose upon one of the tracks of the tractor a drag load heavier than that for the other track, but the cutting blade actually is turned as at 100 with respect to the earth to augment its drag upon the tractor. It will be appreciated that if the power of the tractor and the frictional drive of the tracks upon the earth are so great that the turning effect of shifting the effective drag point of the cutting tool might be somewhat nullified, the increasing of the drag load would increase the turning potential of the drag point shift. Furthermore in this embodiment, the hydraulic piston and cylinder arrangement runs normally without any load thereon and is only burdened when a turn is desired.

With the preferred embodiment of FIG. 8 a lighter weight tractor can be used with greater economy whose combined work effort to both tracks is merely adequate to carry the load of the cutting blade under all expected work conditions. The lateral shift of the effective drag point herein from the longitudinal center line of the tractor will be effective in imposing upon the nearest track a burden substantially heavier than that left upon the far track and the far track will tend to move ahead of the near track while the near track will tend to slip on the ground sufficiently that the differential of power delivered by the respective tracks will be enough to turn the tractor automatically as seen in FIG. 1 while still moving the cutting blade at substantially full speed.

With the preferred arrangement there is no turning of the blade and therefore no increased over-all pulling effort required of the tractor. Furthermore here again the hydraulic piston and cylinder arrangement is only burdened when a turn is being made. At all other times the cutting edge not only runs straight but steadies the tractor so that it will run straight also. Obviously, if there is any difference in the power delivered by the tracks as where one track may be running on soft ground and the other track upon hard ground, it will be obvious that actuation of the cylinder 90 controlling the shift of the drag point can also be utilized to counteract any unequal effort between the tracks so that the tractor can be controlled to run straight as well as to make turns.

The third embodiment (FIGS. 9 and 10) is the simplest in construction with the widest range of effective movement easily attained. However, in this particular embodiment the hydraulic piston and cylinder arrangement is continuously subjected to a lateral burden. This may be desirable or not depending upon desired results to be attained. Knowing there is some sidling or lateral movement of the rear end of a crawler tractor the piston and cylinder may be mounted also to serve as a shock-absorber piston, as where in FIG. 9 the external connection of the piston rod includes an element 104 disposed between opposed compressed springs 106.

Thus the sidling movements of the tractor at the rear end are cushioned with respect to the cutting blade so that the cutting blade is not strained thereby.

As mentioned the shape of the cutting bar is such that it is wider than it is thick. This not only provides it with greater structural strength fore and aft to carry the cutting load imposed upon it by the drag of the tractor when the earth is being cut, but it also provides a substantial lateral face area in contact with the earth which opposes any tendency of the cutting blade to be moved laterally by actuation of the hydraulic piston and cylinder assembly 90. When the piston and cylinder assembly 90 is actuated in either direction the corresponding face of the cutting blade opposes any shift of the cutting blade in the ground and transmits back therefrom an effort that results in lateral movement of the tow-bar, and thereby some movement of the rear end of the tractor laterally which assists the tractor in starting its turn. This moment of force can be varied with the rapidity of actuation of the piston and cylinder assembly. However, it is preferred that this moment of force be of a minor consideration, albeit favorable to a turn being made in the direction desired, because the forward speed of the tractor and the heavy drag of a relative lateral shift of the effective drag point will be and should be the essential turning control factor. This is pointed out for the better understanding of the invention because with human characteristics as they are, even if there was a fast acting piston and cylinder arrangement the operator would still operate the piston and cylinder arrangement at speeds well below its maximum movement. The forward speed of the tractor and the drag point arrangement would almost automatically become the dominant control in steering the tractor while it is laying cable. It would only be when the cutting blade is raised out of the earth that the tractor should be steered by the conventional selective braking of the driving gear wheels.

As shown in FIG. 4 a wire reel 110 is supported upon the dump bucket 112 located at the forward end of the tractor where empty ones can be easily replaced with full ones by lowering and tilting the bucket with conventional controls shown. There also is sufficient space afforded between reel 110 and conduit 60 whereby a splice can be made if desired between the end of the old reel and the start of a new reel with the new reel in place ready to go. Suitable conveyor pulleys 114 are provided by which the cable is conducted to the inlet opening 116 of the L-shaped conduit 60 which carries the wire down to the level of the mole nose 56.

Preferably the cutting blade is trailed by a roller 118 or a trowel like blade member which serves to return the surface of the earth to its former condition and being vertically adjustable serves also as a depth gauge for the cutting blade if desired.

In operation with the tow-bar 28 raised by the cylinder 36 the tractor is brought into position by conventional steering to start paying cable 68. The cable is fed from the reel down through the upright portion 60 of the L-shaped conduit 58 and manually pulled out of the outlet opening 66 thereof. The cut 80 is then started a little distance ahead of a point where surface access to the cable is desired and the tow-bar 28 is released for lowering as the tractor starts to move. As the cutting blade goes down into the ground the free end of the wire is held above the level of the ground and dragged along with the blade with no further length of wire being permitted to pass through the tube 58. However, when full cutting depth is attained by the blade and the starting point of the wire is reached, the free end of the wire above ground is held stationary with respect to the ground and the wire begins to feed from the reel 110 down through the L-shaped conduit 58 and into the tunnel 80 left by the mole nose 56.

With both tracks 16 running at the same speed on the tractor 10, the tractor moves forwardly in a straight with the cutter blade 52 centrally located therebehind. When a turn is desired, the hydraulic piston and cylinder assembly 90 is actuated to shift the effective drag point of the blade laterally from the longitudinal center line 86 of the tractor in the direction that the turn is to be made. Whereupon the drag load is increased for the track on the inside of the turn and the drag load is decreased for the track on the outside of the turn. With this differential in drag effort upon the two tracks, the lightly burdened track having the greater leverage will not slip on the earth as much as the track having the increased drag burden and will thereby operate to turn the tractor. The tractor will go into a turn that is controlled by the degree of lateral movement or lateral offset of the drag load notwithstanding the fact that both racks continue to operate at the same speed and the cutting bar to advance through the earth at an unreduced speed.

It will be appreciated that other means may be provided for increasing the drag effort for one track over that existing for the other track as by dropping drag teeth at one side of the cutting bar, but the present invention and its preferred embodiment causes so little damage to the earth and is sufficiently effective that no additional means is required except under unusual conditions such as a tractor so powerful that the comparative light drag when shifted may not be adequate to provide the turning moment desired.

The effectiveness of the cutter blade to steer the crawler tractor is thus dependent on the turning moment the blade can exert in relation to the weight and power of the tractor. It should be noted, for example, that the embodiment of the present invention shown in detail in FIGS. 2 and 7 can exert a greater turning moment than can the preferred arrangement shown in FIG. 8 due to broaching of the cutter blade against the earth in its turning position. Consequently the configuration shown in FIGS. 2 and 7 is more suited to crawler tractors having relatively high weight and power. In all three configurations the deeper the cutter blade is run, the more drag effect it will have. Thus in operations where depth of the slit cut is not absolutely critical, the operator has a convenient control for adapting the desired effect of the cutter blades in varying ground conditions.

Having described the several embodiments of the invention, and the relative merits thereof, it will be readily apparent to those skilled in the arts how various and further changes can be made to embody the inventive concept and the objects set forth herein without departing from the spirit of the invention, the scope of which is commensurate with the appended claims.

What is claimed is:

1. In combination, an endless track crawler tractor, a tow-bar supported at one end thereof, an earth working implement comprising a cutting blade normally disposed edgewise to the tractor and supported on said tow-bar for movement about a vertical axis defining a point of load application on the tow-bar, and means for shifting the effective point of load application on the tow-bar laterally with respect to the longitudinal center line of the tractor during straight-away operation of the tractor including a piston and cylinder assembly interconnecting said tow-bar and blade at points remote from said axis to impose upon one of the tracks of the crawler tractor a work load heavier than that imposed upon the other track to turn said tractor.

2. In combination, a crawler tractor having spaced endless tracks for simultaneous operation, a tow-bar supported at one end thereof for vertical movement, an earth cutting blade carried by said tow-bar, first means for mounting said blade for pivotal movement with respect to the tow-bar about a vertical axis, second means for supporting said cutter blade against relative vertical movement with respect to the tow-bar, and means carried by said tow-bar for shifting said first means laterally with respect to the longitudinal center line of the tractor during said simultaneous operation to impose upon one of the tracks of the crawler tractor a work load heavier than that imposed upon the other track to steer said tractor in the direction of the shift.

3. The combination called for in claim 1 in which said first means includes a vertical pin engaging said cutter blade, a vertical pin engaging said tow-bar, and said second means includes a link interconnecting said pins.

4. In combination with a crawler tractor, a tow-bar supported at one end thereof, a slide member on said tow-bar, an earth working implement pivotally supported thereon to said slide member, and means interconnecting said tow-bar and slide member for shifting the drag point load laterally with respect to the longitudinal center line of the tractor during its straight-away operation to impose upon one of the tracks of the crawler tractor a work load heavier than that imposed upon the other track to steer said tractor.

5. The combination called for in claim 4 in which said means includes a shock absorbing resilient element between said tow-bar and said implement.

6. In combination an endless track crawler tractor of predetermined pulling power for straight-away operation, a pair of draft arms pivotally mounted at their forward ends to the tractor for vertical movement at their rear ends, a tow-bar, means for supporting the tow-bar on the rear ends of the draft arms for vertical movement with respect to the draft arms, an earth working implement supported on the tow-bar and normally exerting a predetermined load on the tractor on the longitudinal center line of the tractor, and steering means for the tractor including an adjustable member for moving the implement transversely of the tractor in a horizontal direction to shift the effective point of load application of said implement to the tractor laterally with respect to the longitudinal center line of the tractor and to impose upon one of the tracks of the crawler tractor during straight-away operation a work load heavier than that imposed upon the other track to steer said tractor in the direction of said shift.

7. In combination an endless track crawler tractor of predetermined pulling power, a tow-bar supported at one end thereof, an earth working implement comprising a cutting blade supported on the tow-bar and disposed normally in edgewise alignment with the longitudinal center line of the tractor for exerting a predetermined load on the tractor, and steering means for turning the implement from said center line to shift the effective point of load application of said implement to the tractor laterally with respect to the longitudinal center line of the tractor to steer said tractor in the direction of the shift.

8. In combination, an endless track crawler tractor, a tow-bar supported at one end thereof, an earth working implement comprising a cutting blade normally disposed edgewise to the tractor and supported on said tow-bar a spaced distance therebehind for movement about a vertical axis defining a point of load application on the tow-bar normaly located at the longitudinally center line of the tractor, means for moving said cutting blade laterally with respect to the longitudinal center line of the tractor about said vertical axis during straight-away operation of the tractor including a piston and cylinder assembly interconnecting said tow-bar and blade at points remote from said axis to impose upon the track on the inside of a turn a work load heavier than that imposed upon the other track to turn said tractor.

9. In combination, a crawler tractor having spaced endless tracks for straight-away operation, a tow-bar supported at one end thereof for vertical movement, an earth cutting sub soil blade carried by said tow-bar, first means for mounting said blade for pivotal movement with respect to the tow-bar about a vertical axis located normally at the center line of the straight forward draw effort of the tractor, second means for supporting said cutter blade against relative vertical movement with respect to the tow-bar, and means carried by said tow-bar for shifting said blade laterally with respect to the longitudinal center line of the tractor to turn said tractor during straight-away operation.

10. In combination a crawler tractor having spaced endless tracks of predetermined pulling power operating at the same speed, tow means on said tractor disposed at the longitudinal center line of the tractor, work load means pivotally secured to said tow means at its forward end for movement about a vertical axis and engaging the ground against displacement laterally with respect to said center line for moving the work load means transversely of the center line of the tractor in a horizontal direction to turn said tractor during said operation of said endless tracks.

11. In combination a crawler tractor of predetermined pulling power having spaced endless tracks for simultaneous operation, a tow-bar supported at one end to the tractor, an earth working implement supported on the tow-bar and exerting a predetermined drag load on the tractor, and means for steering said tractor including an adjusting control element for shifting the effective point of load application of said implement to the tractor laterally away from the longitudinal center line of the tractor in a horizontal direction to impose upon one of the tracks of the crawler tractor during their simultaneous operation a work load heavier than that imposed upon the other track to steer said tractor in the direction of said shift.

12. In combination an endless track crawler tractor of predetermined pulling power for straight-away operation, tow means supported at one end thereof, a working implement comprising a vertically disposed earth cutting blade disposed normally in edgewise alignment with the longitudinal center line of the tractor and pivotally supported on said tow means for movement about a vertical axis located ahead of the leading edge of said cutting blade for exerting a predetermined load on the tractor, and hydraulic means including an adjusting control element interconnecting said tow means and earth working implement for moving the cutting blade laterally about said pivoted axis with respect to said center line to shift the effective load of said implement on the tractor laterally with respect to the longitudinal center line of the tractor during straight-away operation to steer said tractor.

13. In combination an endless track crawler tractor of predetermined pulling power for straight-away operation, tow means supported at one end thereof, a vertically disposed earth working member comprising a cutting blade disposed normally in edgewise alignment with the longitudinal center line of the tractor, said two means including a draw member, a vertical pin supported on the draw member, an intermediate link pivotally supported by said vertical pin, and a vertically disposed pivot means supporting said earth working member on said intermediate link for exerting a predetermined load on the tractor, and adjustable steering means interconnecting said link and one of said members for turning the implement to said center line to shift the effective point of load application of said implement to the tractor laterally with respect to the longitudinal center line of the tractor during straight-away operation to steer said tractor in the direction of the shift.

References Cited in the file of this patent
UNITED STATES PATENTS

| | | |
|---|---|---|
| 1,964,559 | Collins | June 26, 1934 |
| 2,510,817 | Greiner et al. | June 6, 1950 |
| 2,561,032 | Onfrey | July 17, 1951 |
| 2,608,146 | Lund | Aug. 26, 1952 |
| 2,638,832 | Kinsinger | May 19, 1953 |
| 2,660,938 | Kaupke | Dec. 1, 1953 |
| 2,722,181 | Hash | Nov. 1, 1955 |
| 2,771,043 | Carlson | Nov. 20, 1956 |
| 2,787,876 | Cole | Apr. 9, 1957 |
| 2,797,629 | Kelley | July 2, 1957 |

FOREIGN PATENTS

| | | |
|---|---|---|
| 670,423 | Germany | Jan. 18, 1939 |
| 322,548 | Switzerland | Aug. 15, 1957 |